United States Patent Office

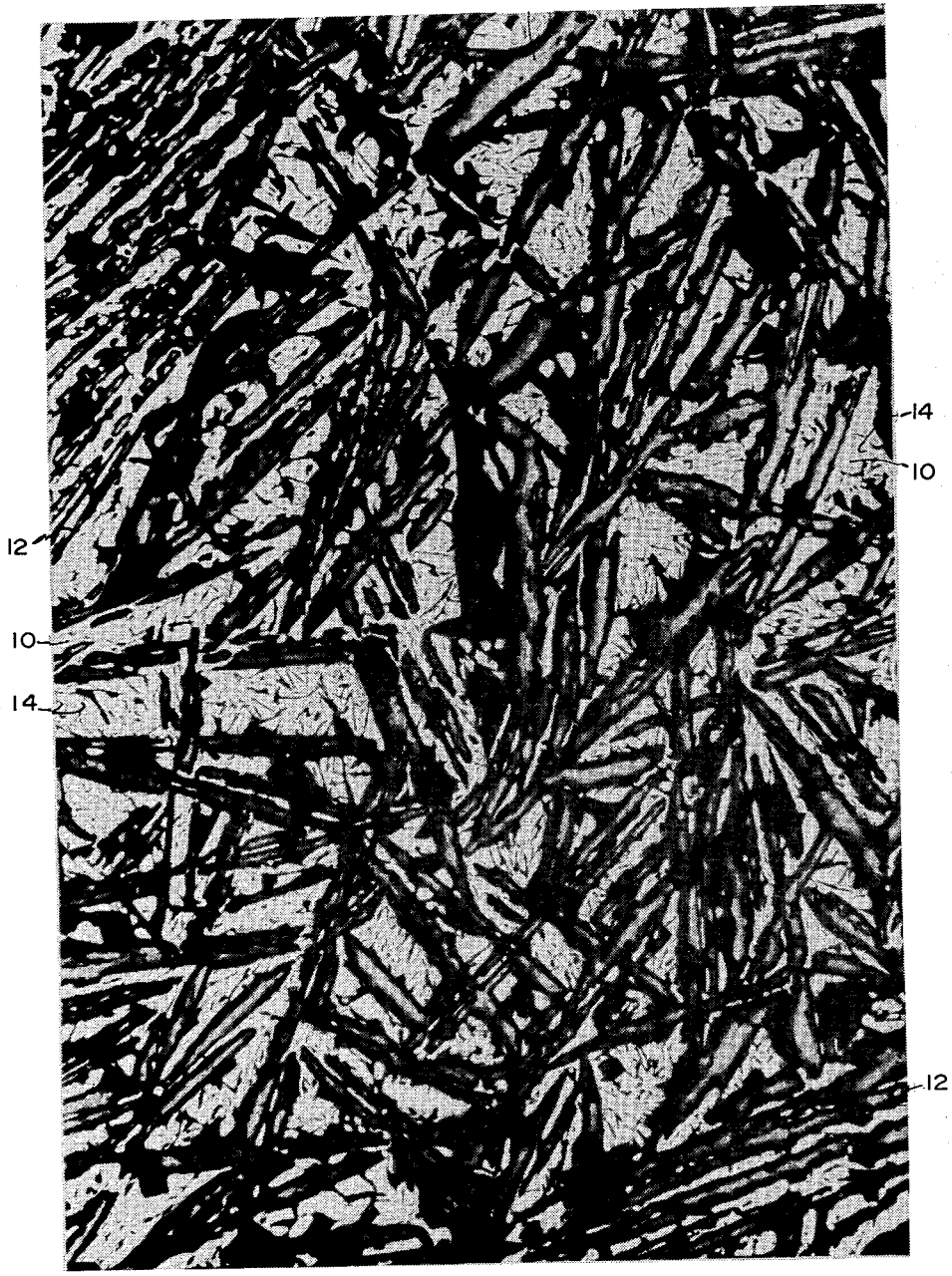

3,340,078
Patented Sept. 5, 1967

3,340,078
FUSED REFRACTORY CASTINGS
Allen M. Alper, Corning, and Robert C. Doman and Robert N. McNally, Horseheads, N.Y., assignors to Corning Glass Works, Corning, N.Y., a corporation of New York
Filed Feb. 24, 1965, Ser. No. 434,813
3 Claims. (Cl. 106—56)

This invention relates to refractory ceramic castings commonly known as fused cast refractory, produced by melting refractory ceramic raw material and pouring the molten material into a preformed mold to solidify as a monolithic casting therein. More specifically, the invention relates to novel fused cast boron carbide-carbon refractory castings exhibiting highly superior resistance to thermal or heat shock and having unusually excellent oxidation resistance at temperatures as high as about 1000° C. or more. By virtue of their composition, these castings are relatively lightweight (i.e. have a relatively low specific gravity) even with a dense, low-porosity structure, although this characteristic can be further enhanced by permitting any desired amount of distributed porosity in the castings. Furthermore, the invention relates to fused cast boron carbide-carbon refractory castings exhibiting excellent resistance to corrosion and erosion by molten ferrous metal and the ferruginous lime slags in reducing atmosphere environments as is commonly found in the basic oxygen steelmaking furnace processes, such as the Stora-Kaldo process. These slags usually have a lime-silica ratio of 1:1 to 1.5:1 at the early stage of a heat and the ratio increases toward the end of a heat to usually in excess of 2.5:1 for the higher lime finishing slags. The reducing atmosphere tends to be predominantly carbon monoxide.

Heretofore, it has been known to produce friable masses of boron carbide by reacting suitable raw material at elevated temperatures that render the material mass molten and then cooling to solidify the mass. These friable masses commonly have been formed in situ in electric resistance furnaces employing carbon resistor elements. Ordinarily these solidified masses were crumbled to a granular mass, which was then used as abrasive grain or was rebonded by known techniques (not involving complete melting and solidification as a monolithic casting) to form hard and highly refractory bodies for a variety of high temperature and/or wear resistance applications as is well known in the art. Although in some early cases, these prior friable masses of fused boron carbide have been produced with an excess of carbon in the material mass forming free carbon in the resulting solidified masses, more recent efforts were mostly made to eliminate such free carbon in the granular materials because it caused difficulties in producing proper abrasive material or wear resistant products, or the free carbon was further reacted with a cabide-forming element, for example, during a rebonding process to form a carbide bonded boron carbide body. Of the earlier solidified boron carbide masses formed in situ in the furnace adjacent a carbon resistor element, some were formed with as much as about 25% free carbon in the form of parallel graphite flakes thereby creating a friable, distinctly laminated, weak structure with poor or incomplete development of boron carbide crystals. Others were formed with much less (i.e. 1 to 2%) free graphite in the form of very thin films located in the grains boundaries (i.e. intergranularly) between and outlining the fairly well developed boron carbide crystals, which causes rather poor corrosion resistance.

It has also been proposed to build up ingot masses substantially free of uncombined carbon in situ in an arc furnace by continuous concurrent arc melting and solidification. Such masses have been found to have numerous transverse planes of weakness or laminar pattern of voids resulting from an apparent discontinuous melting and solidification, or layered solidification of each melted increment of batch material, which causes poor structural integrity and poor corrosion resistance. Hence, these masses are also well suited to being broken up into granular masses for use as noted above.

However, prior to our invention as described herein, to our knowledge, no one has formed fused cast refractory monolithic castings consisting essentially of boron carbide crystals with a substantial amount (i.e. at least 15% or even as low as 5% by weight) of free carbon (graphite) in the form of a random and discontinuous interwoven pattern, or intertexture, of elongated free carbon masses (or graphite crystals) intermingling and interlocking (often intragranularly as well as intergranularly) with the carbide crystals. Nor to our knowledge, as a result have they recognized the great technological benefits to be gained thereby, namely, the superior resistance to thermal shock and elevated temperature oxidation as well as the lightweight and the excellent resistance to corrosion and erosion by molten ferrous metal and ferruginous lime slags as noted above.

Modern day technology continues increasingly to create greater demand for relatively lightweight materials that will withstand high and suddenly applied temperatures, from a standpoint of both thermal shock failure and oxidation. We have now discovered fused cast refractory castings of a novel combination of composition and structure, noticeably free of planes of weakness or laminar voids, that will help meet this continuing demand. Hence, it is one of the principal objects of this invention to provide highly refractory and relatively lightweight castings of fused cast boron carbide-carbon refractory possessing thermal shock resistance superior to that of any fused cast refractory castings commercially produced heretofore to our knowledge. It is also an object of this invention to provide such castings additionally having excellent resistance to oxidation at temperatures up to about 1000° C. or more.

Although the commercial popularity of the basic oxygen steelmaking processes continues to grow, the problem of relatively rapid cnsumption of refractory material making up the linings in these basic oxygen furnaces or vessels continues to seriously hinder the much desired greater economy of operation and greater output. We have also now discovered that this problem can be very materially reduced by providing, and constructing the basic oxygen vessel linings of, the novel castings according to the present invention, which posses a resistance to the corrosive and erosive effects of molten ferrous metal and slag in these processes greatly superior to that of the refractory products more commonly used heretofore for these linings. Accordingly, it is another principal object of this invention to provide these novel fused cast refractory castings having such improved properties for use in making up the linings of basic oxygen furnaces or vessels. The castings of this invention are particularly suitable for forming the working lining of the basic oxygen vessels that conventionally comprise a generally pear-shaped or barrel-shaped metal tank or casing, insulating refractory lining covering the internal surfaces of this tank, working refractory lining covering the internal surfaces of the insulating refractory lining and a water cooled lance or means for providing an oxygen blast directed into the refractory lined tank.

The present invention is an article of manufacture that can be generally defined as a fused cast refractory casting consisting essentially of at least 5% by weight free carbon in the form of a random and discontinuous interwoven pattern, or intertexture, of elongated free carbon masses (or graphite crystals) intermingling and interlocking with substantially randomly oriented boron carbide crystals, and the casting analytically comprises essentially carbon and at least 15% by weight of boron. While these are the only two essential analytical components of the casting, limited amounts of other optional analytical components (as specified below) may be included as desired and without deleteriously affecting the basic novel properties (as indicated above). Inclusion of these optional analytical components will usually depend upon the precise properties desired in the final casting product, the processing conditions desirably employed and the raw materials that are desired to be used.

The optional analytical components permissible in the castings according to this invention may be categorized as diluents and/or impurities. Oxygen and nitrogen are here generally categorized as diluents, although in some cases they may be in a sense deemed impurities while in other cases they may be deemed desirable additives. Each of the oxygen and nitrogen should not analytically exceed 10% by weight of the casting and the total sum of oxygen plus nitrogen should not analytically exceed 15% by weight of the casting in order to avoid deleteriously affecting the basic novel properties, such as the thermal shock resistance and the corrosion-erosion resistance. The casting may also contain analytically, as a remainder, other elements up to 5% by weight as impurities or minor diluent additives. Many of such other elements will commonly result from the use of less pure raw materials and may include (although not limited thereto) elements such as aluminum, alkali metals, alkaline earth metals, rare earth metals, sulfur, phosphorus, iron, silicon, etc. Again the limitation on the remainder of these other elements is generally necessary to avoid deleteriously affecting one or more of the basic novel properties including that of lightweight.

In connection with the further detailed description of this invention, reference will be made to the sole figure of the drawing, which is a photomicrograph (magnification approx. 120×) of an exemplary microstructure of a casting according to the present invention.

In carrying out this invention, the raw materials (preferably premixed) can be either a mixture of boron carbide and carbon or graphite, or a mixture of boron and/or boric oxide with an excess amount of carbon to form the boron carbide and free carbon (graphite). These mixtures can be readily melted, without excessive loss of material by sublimation and/or vaporization, in either an electric induction melting furnace employing a graphite lining or pot, or in a conventional electric arc melting furnace employing graphite electrodes in the same manner as is common in producing other fused cast type refractories or in producing calcium carbide.

In the case of the arc melting furnace, the lining of the furnace shell need not be specially constructed of graphite because the melting operation is carried out in the customary manner of forming a molten pool contained within a surrounding mass of unmelted and unreacted and/or partially reacted batch mixture material as a protective liner to prevent contamination of the molten bath. In order to avoid excessive oxidation of the charge by the ambient air, appropriate measures should be taken to maintain a neutral or reducing atmosphere in contact with the top exposed surfaces of the charge. For example, an appropriate loose fitting crown or cover over the top opening of the furnace can be employed to regulate the exhaust of the reducing gases and fume produced during the melting operation so as to substantially prevent ingress of air into the furnace chamber.

Some of the carbon content of the molten product is obtained from the graphite electrodes or the graphite liner (as the case may be) and, therefore, the amount of carbon employed in the batch mixtures is kept less than the total amount of carbon necessary to form the particular composition desired. No precise rule of proportioning can be specified as the amount of carbon from either source will vary depending upon such common variable process factors as time, temperature, rate of power input, etc., which factors usually vary with each furnace and furnace operator. In any event, the appropriate proportioning can be readily determined by those skilled in this art by minimal trial experience.

After an appropriate quantity of molten batch material has been formed, the molten mass is quickly poured into graphite molds provided with the usual font header and surrounded in the conventional manner with annealing powder, such as alumina powder, powdered coke, etc. The top of the font header is also covered with annealing powder and the cast molten material is allowed to solidify therein to form a monolithic casting of fused cast refractory having the shape of the mold cavity. This procedure produces relatively rapid solidification yielding substantially random shaped boron carbide crystals or crystalline masses that are substantially (i.e. at least 40% by weight of the crystals) randomly oriented and that are of relatively medium-to-fine grain size. The free carbon (which in most cases is crystalline graphite) forms as a random and semicontinuous interwoven pattern, or intertexture, of elongated masses (crystals) intermingling with the boron carbide crystals. In many cases, the elongated free carbon or graphite crystals are bonded in an interlocking manner with the carbide crystals that is typical only of fused cast refractory.

The microstructures of castings according to this invention will be better understood by reference to the accompanying figure. The illustrated microstructure is that of example No. 4 shown in Table I below and is exemplary of all the examples disclosed herein. The light areas 10 are the randomly shaped and randomly oriented boron carbide crystals. The random and discontinuous interwoven pattern or intertexture of free carbon comprises the large elongated dark appearing masses 12 of primary graphite crystals and the smaller elongated dark appearing masses 14 that appear to be part of a eutectic structure or exsolved (precipitated) graphite within boron carbide crystals. As is evident from the figure, crystal bonding includes graphite-to-graphite as well as carbide-to-graphite. In many instances, it can be seen that the carbide-to-graphite bonding forms irregular boundaries of an interlocking nature. Although not readily evident in the limited field shown in the figure, carbide-to-carbide crystal bonding is also observed in these fused cast refractory castings.

By way of illustration and providing a better understanding of this invention, a series of examples are given in Table I together with data pointing up the unique characteristics of the invention. All these examples were produced by melting in an induction furnace having a graphite pot.

TABLE I

| No. | Batch[1] Mixture | Chemical[1] Analysis | Phase[1] Analysis | T.S. cycles | O.R.[2] | Percent Slag Cut | Percent Fe Cut | S.G. |
|---|---|---|---|---|---|---|---|---|
| 1 | 87% B<br>13% C | 45.6% B<br>54.4% C | 58.2% $B_4C$<br>1.9% lge. G<br>39.9% sm. G | | Exc. | | 22 | 2.5 |
| 2 | 83% B<br>17% C | 53.7% B<br>46.3% C | $B_4C$<br>>10% G | | Very good | | 6 | 2.3 |
| 3 | 75% B<br>25% C | 42.4% B<br>57.6% C | 54.2% $B_4C$<br>18.3% lge. G<br>27.5% sm. G | >8 | Very good | 13 | | 2.3 |
| 4 | 65% B<br>35% C | 34.0% B<br>66.0% C | 43.0% $B_4C$<br>33.9% lge. G<br>22.8% sm. G | >8 | exc. | 26 | 2 | |
| 5 | 73.2% B<br>19.8% C<br>7.0% Ti | 24.6% B<br>71.2% C<br>4.2% Ti | 29.0% $B_4C$<br>6.1% $TiB_2$<br>64.9% G | >8 | exc. | | 4 | 2.6 |
| 6 | 66.5% B<br>30.0% C<br>3.5% Ti | | $B_4C$, $TiB_2$<br>>10% G | >8 | exc. | | 5 | 2.4 |
| 7 | 66.5% B<br>29.5% C<br>4.0% Zr | 40.7% B<br>58.3% C<br>1.1% Zr | 51.7% $B_4C$<br>1.3% $ZrB_2$<br>21.7% sm. G<br>25.4% lge. G | | Very good | | 6 | 2.3 |

[1] In percent by weight. [2] Exc. means excellent.

The raw materials used in the batch mixtures were commercially pure boron (B), carbon black (C), titanium metal sponge (Ti) and zirconium metal sponge (Zr). A typical analysis of the boron is, by weight, 91% net boron, 0.3% water soluble boron, 4.2% magnesium, 0.3% $H_2O_2$ insolubles and 0.25% moisture. For the titanium and zirconium sponges, typical analyses by weight are, respectively, 99.3% Ti, 0.40% max. Mg, 0.1% Fe, 0.15% max. Cl, and 99.2% Zr+Hf (Hf approx. 2%), 0.2% max. Cr+Fe.

The phase analysis data were obtained from samples by the conventional point count method. The free carbon was found in these examples to be present as crystalline graphite (G). The quantity of large primary crystals are reported separately from the smaller eutectic or exsolved graphite. Sample No. 4 was found to additionally contain about 0.3% boron.

The highly superior thermal shock resistance data (T.S.) are based on a severe test that involved cutting an approximately 1″ x ¾″ x ½″ sample from each example, heating the sample to 1800° C. and then dropping the hot sample into water at room temperature. This procedure constitutes one cycle of this severe test. At the end of each cycle, the sample is examined for the occurrence of one or more thermal shock fractures. If none are found, the cycle is repeated until such fracturing is observed and the total number of cycles completed at that time are noted. However, no sample was subjected to more than eight cycles for economy purposes since no fracturing at the end of eight cycles in this test is, without doubt, indicative of highly superior thermal shock resistance. The samples that showed no fracturing at the end of eight cycles are noted as >8 cycles.

In contrast to the present invention, an identical sized sample of the commercial fused cast refractory that, to our knowledge, exhibited the highest degree of thermal shock resistance heretofore shattered into about three pieces on the second cycle in the above-described test. Such commercial refractory is a fused and cast mixture of, by weight, 98.81% alumina, 0.52% quicklime and 0.67% fluorspar. Another fused cast refractory that had previously been found to have relatively good thermal shock resistance is that of fused cast pure magnesium oxide castings having a crystalline texture consisting of at least 75 volume percent of equant, unoriented, periclase crystals with a majority of these crystals having a fine-to-medium grain size ranging from 20 to 5000 microns. Identical sized samples of these magnesia castings shattered into two or three pieces on the first or second cycle of the same test.

Oxidation resistance (O.R) was determined by heating samples for 16 hours at 1000° C., thereafter cooling them to room temperature and X-raying them to determine the presence of oxide phase in quantity greater than in the original sample before testing. Substantially no increase in oxide phase content was indicative of excellent oxidation resistance while a very minor amount of increased oxide (e.g. $B_2O_3$) was denoted as very good resistance. The high degree of oxidation resistance appears to be at least partly the result of a thin, boron oxide-rich, glassy film forming on the external surfaces of the body, which film retards further oxidation of the body. Other tests at temperatures as high as 1650° C. for 16 hours show that reasonably good oxidation resistance persists even at such higher temperatures.

In order to demonstrate the improved slag resistance of this invention under reducing atmosphere conditions of basic oxygen steelmaking processes, the following test was conducted for samples of this invention as well as of prior art materials, two of which are more commonly used for basic oxygen furnace linings. The test comprised placing 1½″ x 1″ x ½″ samples in a gas-oxygen furnace adapted to approximate the temperature and reducing atmosphere of a basic oxygen furnace. At 1700° C. for 2½ to 3 hours, the samples were passed, with one of their largest surfaces facing upward, through a downwardly directed stream of molten high-lime basic ferruginous slag droplets at a substantially uniform rate of 60 times per hour until 2 kilograms of slag had been employed. The slag was representative of basic oxygen furnace slag developed during the production of a heat of steel and had the following composition, by weight: 23.75% $Fe_2O_3$, 25.94% $SiO_2$, 40.86% CaO, 6.25% MgO and 3.20% $Al_2O_3$. At the end of the test, the average thickness of the samples was measured and compared with the original ½″ thickness. The results are expressed as a percentage change in thickness (called percent slag cut).

In contrast to the present invention, a sample of more conventional tar bonded dolomite brick exhibited a slag cut of 100% (i.e. the sample was completely cut in half) in the same test. Samples of a common commercial fused cast basic refractory made from a mixture of essentially 55% by weight magnesite and 45% by weight chrome ore exhibit slap cuts of 50–100%. The refractory castings of this invention compare favorably with another recently developed fused cast basic refractory for basic oxygen furnace linings. This latter refractory is a fused and cast mixture of 90% by weight magnesite and 10% by weight rutile, and it exhibits a slag cut of 25–30% in the above-described test. It is also interesting to note the comparison of graphite (electrode grade) in the same test. A series of ten samples of the graphite exhibited slag cuts of 24–45%.

The refractory product of this invention has also exhibited good resistance to attack by molten iron as demonstrated by the results of a test involving immersing a sample in molten iron at 1750° C. for ½ hour. The sample is of the same size as employed in the above-described slag resistance test and the percent Fe cut is determined in the same manner as the percent slag cut.

Also shown in Table I is the lightweight character or low specific gravity (S.G.) for the present invention, which characteristic is unique in the art of fused cast refractories.

As will be seen from the data of Table I, refractory castings of this invention may analytically contain other elements (e.g. Ti or Zr) in minor amounts not greater than 5% by weight as impurities or minor diluents without adversely affecting any of the basic novel properties of the invention, especially the unique property of lightweight.

While the castings of the present invention broadly require only analytically 15% by weight of boron, it is particularly desirable for optimum results that the boron be at least 30% by weight. Preferably, the total content of oxygen plus nitrogen should not exceed 10% by weight, but optimum corrosion resistance to basic oxygen furnace slag is attained by keeping this total content to no more than 5% by weight and desirably as low as 1% by weight. Minimizing the impurities to as low as 1% by weight will also assure optimum properties.

While the amount of free carbon or graphite, broadly speaking, can be as low as 5% by weight, this limit tends to include some casting compositions possessing only minimal improvement in thermal shock resistance that is possible with this invention. For assurance of outstandingly superior thermal shock resistance, the free carbon or graphite content should be at least 15% by weight.

Castings with graphite in excess of 45% by weight are particularly unique in that they are comparable to pure graphite for many applications, but without certain disadvantages of the latter material. Thus, these very high graphite content castings are superior to pure graphite in that they have greater oxidation resistance, greater erosion resistance and greater strength.

Although the term "alloy" is more commonly applied to substances composed of only two or more metals that are dissolved in each other in the molten state and then solidified, due to the similar and/or analogous nature of the castings of this invention, these castings can be said to be composed of an alloy of essentially carbon and boron.

We claim:

1. As an article of manufacture, a fused cast refractory casting consisting essentially of at least 5% by weight free carbon in the form of a random and discontinuous intertexture of elongated masses intermingling and interlocking with substantially randomly oriented boron carbide crystals, said casting analytically comprising essentially: (1) carbon, (2) at least 15% by weight of boron, (3) 0 to 15% by weight of at least one diluent selected from the group consisting of not more than 10% by weight of oxygen and not more than 10% by weight of nitrogen, and (4) a remainder, if any, of 0 to 5% by weight of other elements.

2. As an article of manufacture, a fused cast refractory casting consisting essentially of at least 15% by weight graphite in the form of a random and discontinuous intertexture of elongated masses intermingling and interlocking with substantially randomly oriented boron carbide crystals, said casting analytically comprising essentially: (1) carbon, (2) at least 30% by weight of boron, (3) 0 to 5% by weight of at least one diluent selected from the group consisting of oxygen and nitrogen, and (4) a remainder, if any, of 0 to 5% by weight of other elements.

3. As an article of manufacture, a fused cast refractory casting consisting essentially of more than 45% by weight graphite in the form of a random and discontinuous intertexture of elongated masses intermingling and interlocking with substantially randomly oriented boron carbide crystals, said casting analytically comprising essentially: (1) carbon, (2) at least 30% by weight of boron, (3) 0 to 5% by weight of at least one diluent selected from the group consisting of oxygen and nitrogen, and (4) a remainder, if any, of 0 to 5% by weight of other elements.

No references cited.

TOBIAS E. LEVOW, *Primary Examiner.*

J. E. POER, *Assistant Examiner.*